(12) United States Patent
Stoichita et al.

(10) Patent No.: US 10,381,918 B1
(45) Date of Patent: Aug. 13, 2019

(54) MULTI-PHASE PARALLELABLE CONSTANT ON TIME BUCK CONTROLLER WITH PHASE INTERLEAVING ENSURED BY RIPPLE INJECTION

(71) Applicant: Microchip Technology Incorporated, Chandler, AZ (US)

(72) Inventors: Ioan Stoichita, Campbell, CA (US); Alexander Mednik, Campbell, CA (US); Surya Talari, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/053,438

(22) Filed: Aug. 2, 2018

Related U.S. Application Data

(60) Provisional application No. 62/632,204, filed on Feb. 19, 2018.

(51) Int. Cl.
*H02M 1/15* (2006.01)
*H02M 3/157* (2006.01)
(Continued)

(52) U.S. Cl.
CPC ............. *H02M 1/15* (2013.01); *H02M 3/157* (2013.01); *H02M 3/1584* (2013.01);
(Continued)

(58) Field of Classification Search
CPC ....... H02M 3/156–158; H02M 3/1582; H02M 3/1584; H02M 1/08; H02M 1/15; H02M 1/32; Y02B 70/1466
(Continued)

(56) References Cited

U.S. PATENT DOCUMENTS 6,674,274 B2 * 1/2004 Hobrecht ................ H02J 1/102
323/268
2007/0291520 A1 12/2007 Schuellein
(Continued)

OTHER PUBLICATIONS

International Search Report and Written Opinion of the International Searching Authority, or the Declaration, dated May 28, 2019, European Patent Office.

*Primary Examiner* — Yemane Mehari
(74) *Attorney, Agent, or Firm* — Burr & Forman LLP; Jeffrey H. Kamenetsky

(57) ABSTRACT

A multiple-phase parallelable constant on time (COT) buck controller, a first phase containing a first memory bit and a second phase containing a second memory bit. The COT buck controller includes a first converter comprising a first constant $T_{ON}$ generator configured to sense and deliver a first $T_{ON}$ request when the first memory bit is in a logic one state, and a second converter connected in parallel with the first converter, the second converter comprising a second constant $T_{ON}$ generator configured to sense and deliver a second $T_{ON}$ request when the second memory bit is in the logic one state, only one of the first memory bit and the second memory bit being in the logic one state thus generating activity in a daisy chain ring where each of the first converter and the second converter senses and delivers a corresponding $T_{ON}$ request in a sequential manner.

19 Claims, 8 Drawing Sheets

(51) Int. Cl.
  *H02M 3/158*  (2006.01)
  *H02M 3/156*  (2006.01)

(52) U.S. Cl.
  CPC .......... *H02M 3/156* (2013.01); *H02M 3/1588* (2013.01); *Y02B 70/1466* (2013.01)

(58) Field of Classification Search
  USPC .................... 323/222, 235, 271, 282, 299
  See application file for complete search history.

(56) References Cited

U.S. PATENT DOCUMENTS

| | | | |
|---|---|---|---|
| 2011/0057632 A1* | 3/2011 | Cheng ................... | H02M 3/156 323/234 |
| 2014/0300274 A1* | 10/2014 | Acatrinei .......... | H05B 33/0815 315/85 |
| 2015/0270770 A1* | 9/2015 | Schroeder ............. | H02M 3/156 307/31 |
| 2016/0043624 A1* | 2/2016 | Jarvinen ............... | H02M 1/084 323/271 |
| 2016/0315538 A1 | 10/2016 | Nguyen et al. | |
| 2017/0110963 A1* | 4/2017 | Mattingly ............. | G01R 31/40 |

* cited by examiner

Master Controller and Five Slave Controllers, 12-Phases

MULTI-PHASE PARALLELABLE CONSTANT ON TIME BUCK CONTROLLER WITH PHASE INTERLEAVING ENSURED BY RIPPLE INJECTION

CROSS-REFERENCE TO RELATED APPLICATION

This application claims the benefit of U.S. Provisional Patent Application No. 62/632,204, filed on Feb. 19, 2018, which is incorporated herein by reference in its entirety.

TECHNICAL FIELD

The present disclosure relates to constant on-time ("COT") step-down switching regulators, and in particular to multiphase and parallelable COT step-down switching regulators including those with ripple injection.

BACKGROUND

Step-down switching regulators are commonly used. The necessity to deliver more current on the same output has generated a multiphase and parallelable class of such switching regulators. A typical multi-phase regulator is shown in FIG. 1. One issue to be solved when paralleling or interleaving is to generate the correct phasing or the equivalent correct time positioning of the switching node SW rise time. As illustrated on FIG. 1, SW1, SW2 and SW3 are precisely positioned in a period so that the distance between the rising edges is T/3 or 120°. In the case of a system with n phases, the distances will be T/n or 360/n.

Some known attempted solutions are generated for fixed frequency DC-DC control systems (e.g., Voltage Mode Control, Peak Current Mode Control, and Average Current Mode Control). The precise phasing information is obtained using the main clock from the master and adding programmable delays in the slaves as shown in FIGS. 2 and 3. FIG. 2 illustrates the circuit diagram for a TPS40140 STACKABLE 2 CHANNEL MULTIPHASE INDEPENDENT OUTPUT CONTROLLER from Texas Instruments, showing a master controller and five slave controllers. FIG. 3 illustrates the circuit diagram for a TPS40180 SINGLE PHASE STACKABLE CONTROLLER from Texas Instruments, showing a single-output stacked configuration of a master controller and three slave controllers.

Other known attempted solutions are the TPS51727 DUAL-PHASE, ECO-MODE™ STEP-DOWN POWER MANAGEMENT IC FOR 50-A+ APPLICATIONS from Texas Instruments. In a steady-state condition, the two phases of the TPS51727 switch 180° out-of-phase. The phase displacement is maintained both by the architecture (which does not allow both top gate drives to be on in any condition) and the current ripple (which forces the pulses to be spaced equally). The TPS51727 is based on current ripple to realize the phasing and regulation and due to the architecture choice cannot work with duty cycles greater than 50%. The ripple in front of the Pulse Width Modulation (PWM) comparator is realized by injecting the measured current ripple. The attempted solution offered by the TPS51727 COT controller does not allow paralleling several chips to realize 4, 6, 8, 10, 12, etc. phase systems, nor are the chips stackable, or parallelable.

Solving the interleaving/phasing issue opens the way to add other necessary features such as current sharing/balancing, adaptive voltage positioning, and phase shedding.

Voltage mode control multiphase and parallelable switching regulators have the advantage of solving the interleaving problem by creating shifted-saw tooth waveforms which, when compared with the error amplifier output, generates correct phased signals. These paralleled switching regulators share the same clock and the information to program the slave for 180 degree for two switchers, 120 degree for three switchers, and 90 degree for four switchers. Also, each switcher needs current sensing and a correction of each duty cycle using the current information to allow balanced current in each phase to allow equal power dissipation. The correct current sharing requires precise current sensing and analog signal processing. This means the generation of the equivalent average current and control of the duty cycle of each phase to get the phase current equal with the average.

Current mode control (average, peak, valley) also has the advantage of solving the interleaving problem by sharing the same clock and generating from that the necessary phase for each switcher. This type of control has the advantage of using the sensed current not only in the control loop but also to obtain precise current sharing through each phase. The necessary added slope compensation in this case presents additional challenges related to precision, trimming and matching for different chips.

A subcategory of the multiphase and parallelable switching regulators is the ripple controlled constant on-time step-down controllers with ripple injection. In particular, constant on-time controllers have a variable frequency resulting from the fact that in order to regulate, $T_{OFF}$ is modulated. The above situation makes the problem of precise interleaving/phasing more difficult. In order to keep the advantages of the fast transient of the Constant $T_{ON}$ it also is desirable to have each phase behave independently with respect to modulating its $T_{OFF}$.

An example of a proposed solution is described in U.S. Pat. No. 9,383,761. In this solution, a "common switching frequency and a common period" are used together with "a clock divider" and "ring of D flip-flops" to generate the interleaving. Another example of a phase interleaving solution is where one $T_{ON}$ generator is distributed sequentially to each phase using a multiplexer. While this insures precise identical $T_{ON}$, it denies the possibility of $T_{ON}$ time superposition and limits the duty cycle to values greater than 50%.

SUMMARY

According to one aspect of the disclosure, a multiple-phase parallelable constant on time (COT) buck controller is provided. A first phase contains a first memory bit and a second phase contains a second memory bit. The controller includes a first converter comprising a first constant $T_{ON}$ generator configured to sense and deliver a first $T_{ON}$ request when the first memory bit is in a logic one state, and a second converter connected in parallel with the first converter, the second converter comprising a second constant $T_{ON}$ generator configured to sense and deliver a second $T_{ON}$ request when the second memory bit is in the logic one state, only one of the first memory bit and the second memory bit being in the logic one state thus generating activity in a daisy chain ring wherein each of the first converter and the second converter senses and delivers a corresponding $T_{ON}$ request in a sequential manner.

According to another aspect of the disclosure, a method of paralleling dual COT buck converters is provided. The method includes sensing and delivering, by a first converter, a first $T_{ON}$ request when a first memory bit of a first phase is in a logic one state, and sensing and delivering, by a second converter, a second $T_{ON}$ request when a second memory bit in a second phase is the logic one state, the second converter connected in parallel with the first converter, wherein, only one of the first memory bit and the second memory bit is in the logic one state thus generating activity in a daisy chain ring wherein each of the first converter and the second converter senses and delivers a corresponding $T_{ON}$ request in a sequential manner.

According to another aspect of the disclosure, a method of using calibrated injection ripple internally or externally for single or multiphase converters in order to generate a constant ripple in a feedback pin independent of $V_{IN}$, $V_{OUT}$ or duty cycle thus providing COT converters increased precision, stability and duty cycle, is provided.

BRIEF DESCRIPTION OF DRAWINGS

A more complete understanding of the present embodiments, and the attendant advantages and features thereof, will be more readily understood by reference to the following detailed description when considered in conjunction with the accompanying drawings wherein.

DETAILED DESCRIPTION OF EXEMPLARY EMBODIMENTS

An object of the present disclosure is to define the handshake signals and methods to parallel/interleave COT DC-DC controllers which, by definition, do not have a fixed frequency and a master clock to derive the phase relation for the slaves. In order to regulate this, these type of converters need to vary the $T_{OFF}$ time and so they have a variable frequency.

The paralleling of buck controllers is needed for: delivering more output power with good thermal performance, i.e., higher output currents; improving load transient; reducing output capacitance; and reducing input capacitance.

The present disclosure provides a solution for paralleling and interleaving multiple COT step-down controllers. The embodiments disclosed herein are not limited to any number of controllers. Thus, the solution may be applied to 2, 3, 4 . . . n COT controllers.

The integrated circuit (IC), architecture, method and timing described in FIGS. 4-8 are general and do not imply any limitation to just a dual COT controller but can also refer to a single parallelable COT controller or multiphase COT controller where the external injection is reproduced internally or other equivalent alternatives or modified versions which reproduce the spirit of the methodologies disclosed herein.

Figure 4:
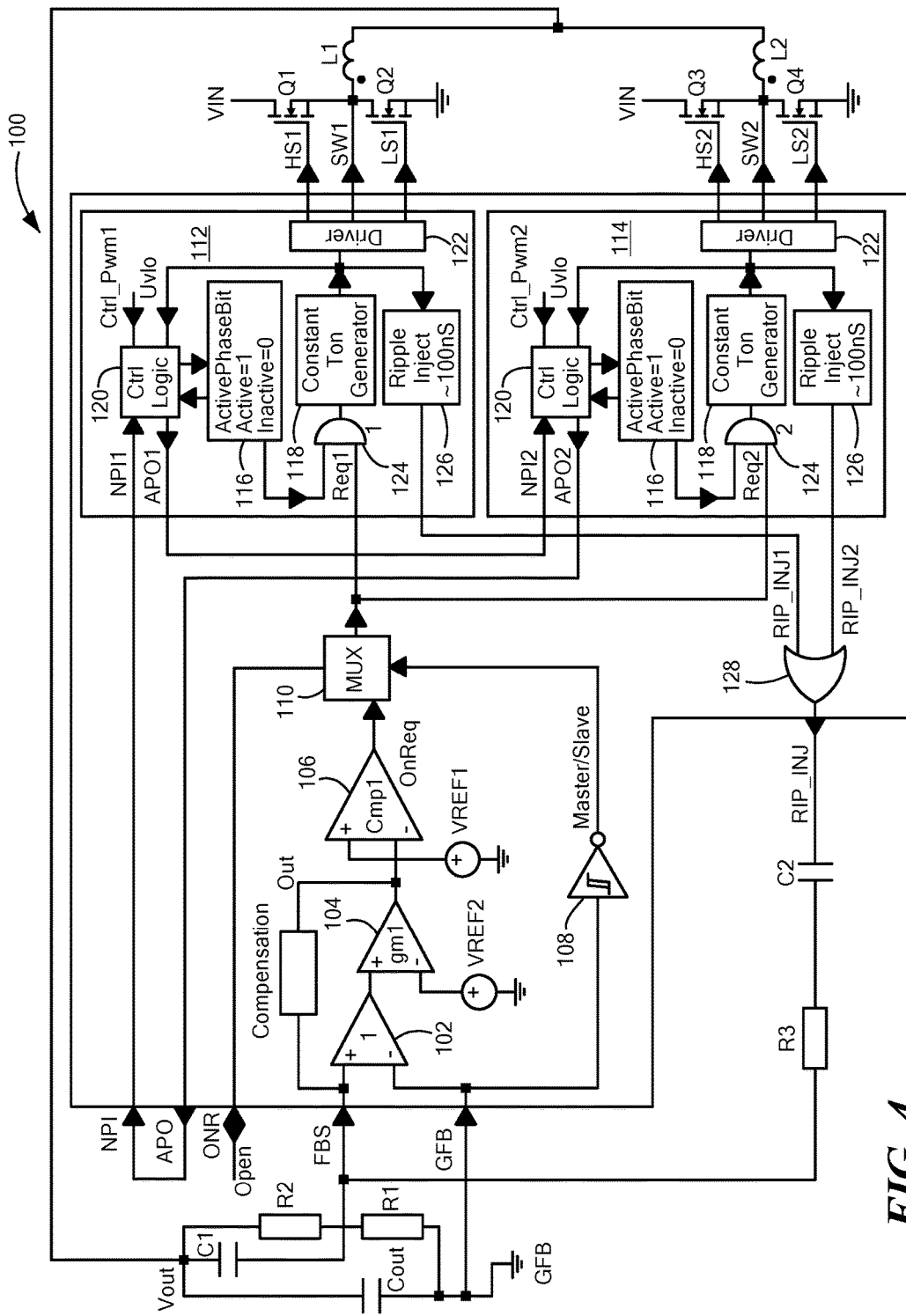
FIG. 4 is a functional block diagram and circuit of a parallelable dual COT buck controller with external ripple injection in accordance with principles of the present disclosure.

FIG. 4 is a block diagram schematic of a dual COT controller 100 with external injection according to the present disclosure. Although the architecture illustrated in FIG. 4 shows only two converters, it is within the spirit of the present disclosure to provide a COT controller 100 that allows for the paralleling or 2, 4, 6, . . . 2n, converters. In order to better explain the present disclosure, all pins which are not relevant to interleaving and parallel functionality are not shown in the figures.

Figure 1:
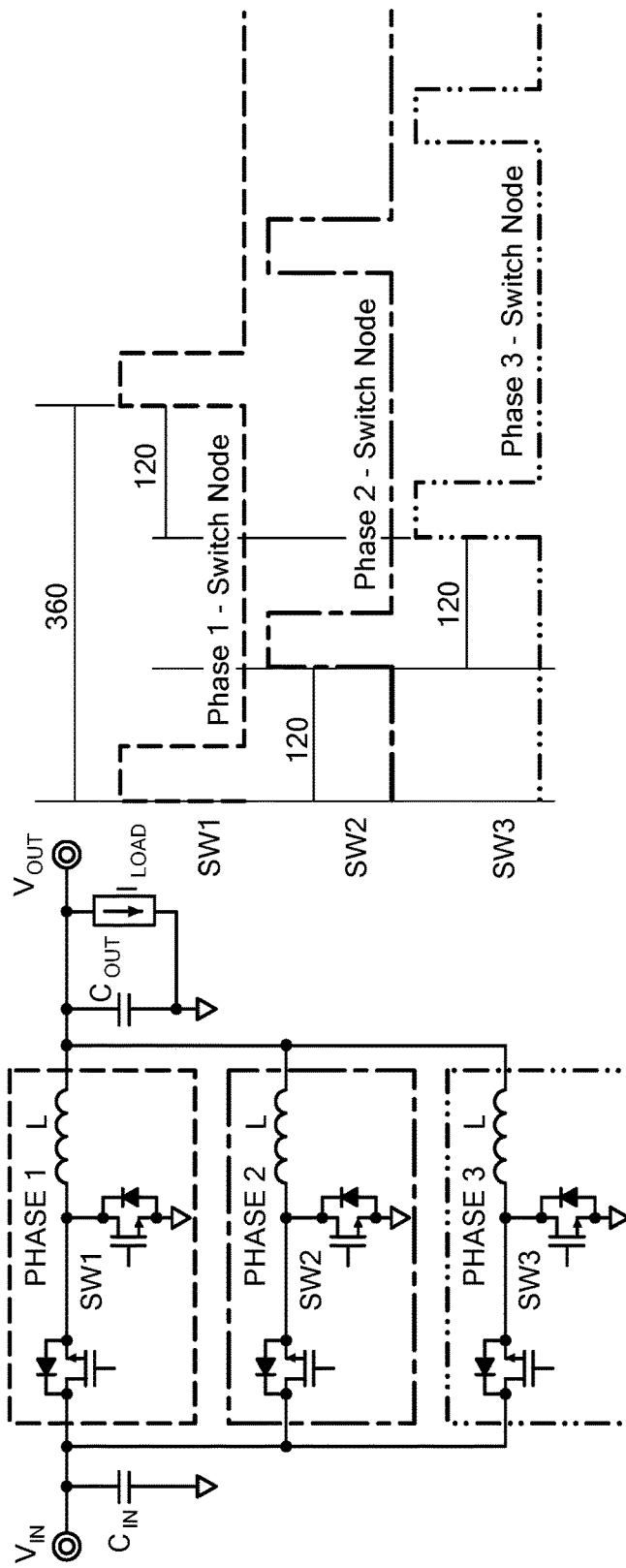
FIG. 1 is a circuit diagram of a prior art multiphase three-phase regulator.
Figure 2:
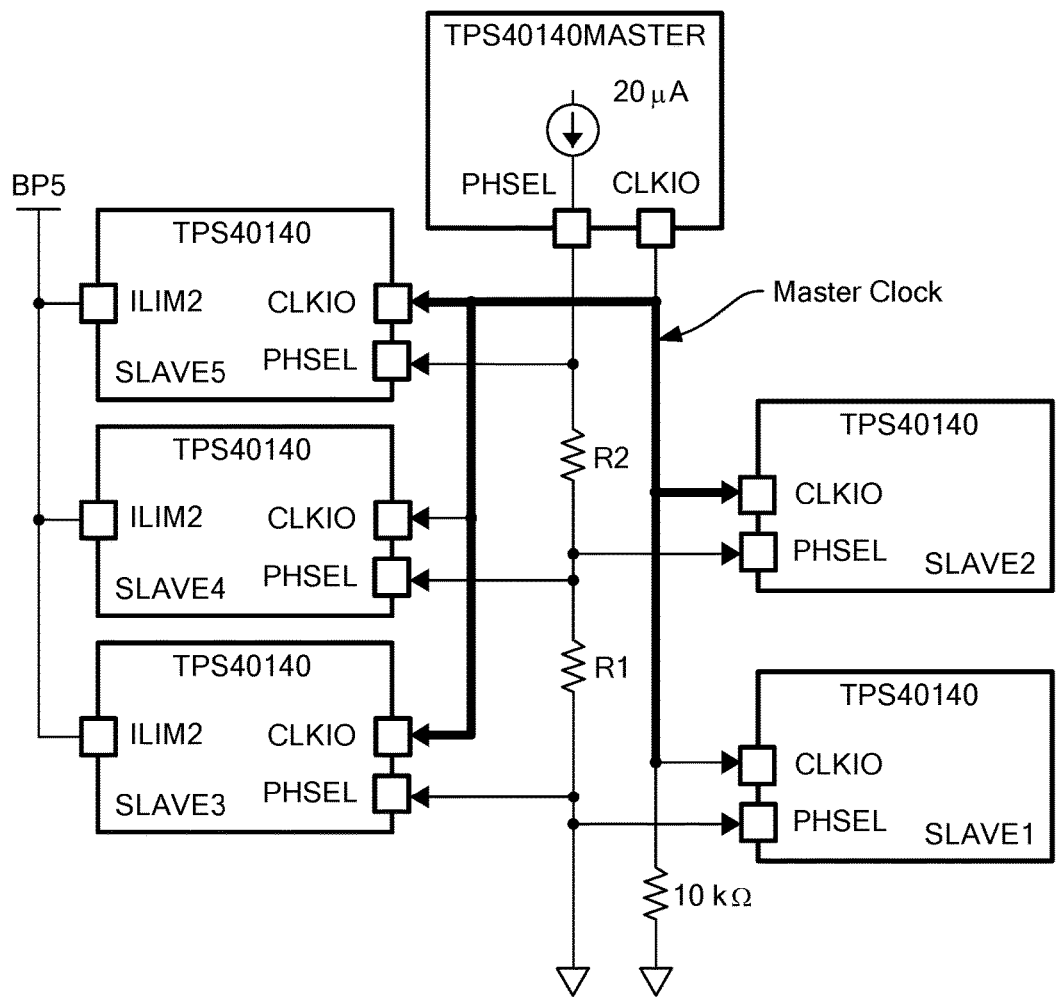
FIG. 2 is a circuit diagram of a prior art multi-phase buck controller utilizing a master controller and five slave controllers.
Figure 3:
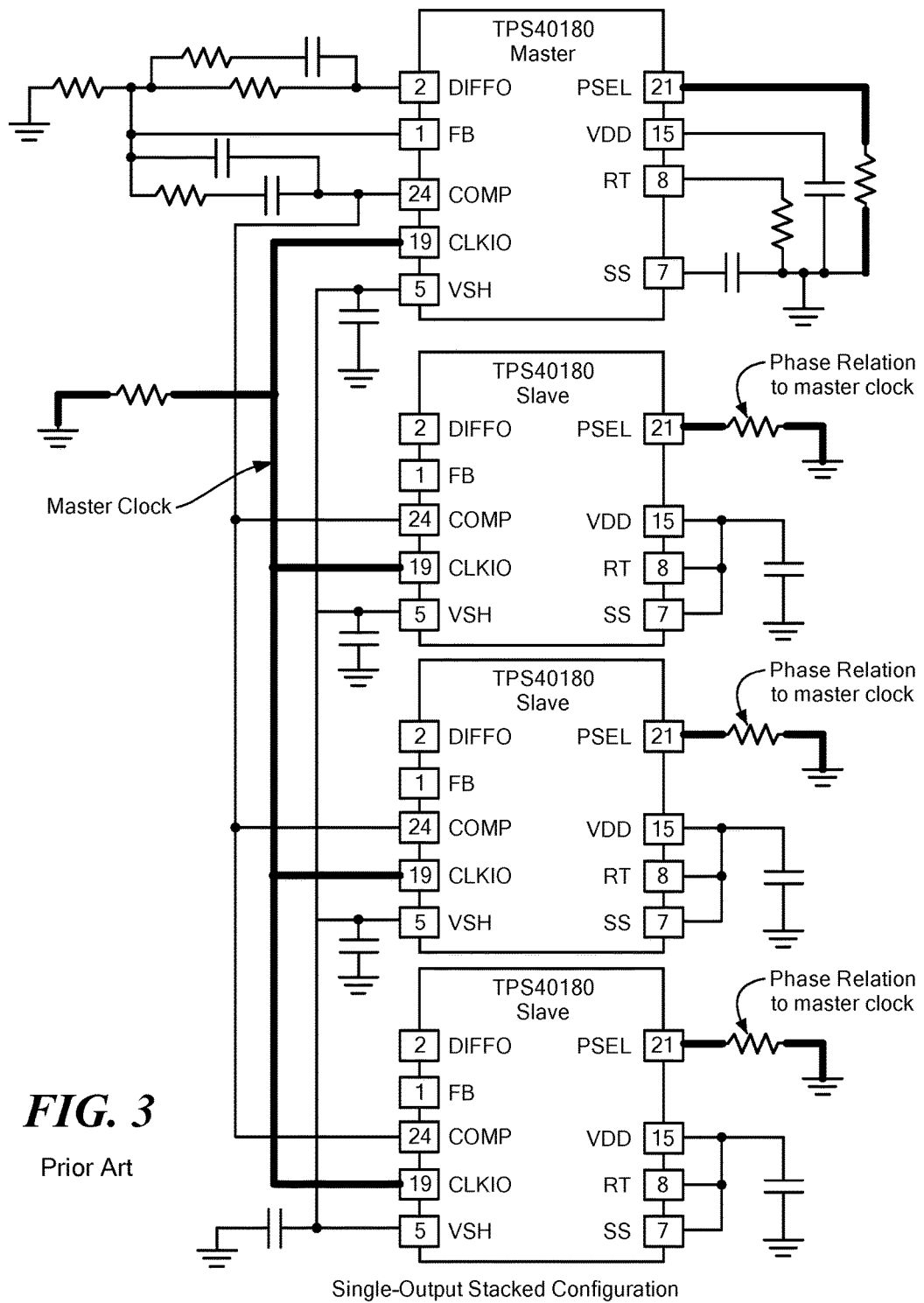
FIG. 3 is a circuit diagram of a prior art multi-phase buck controller utilizing four controllers in a single-output stacked configuration.

In the embodiment illustrated in FIG. 4, dual COT controller 100 includes a differential amplifier 102 with gain 1 to insure remote load sensing, and an error amplifier 104 with main reference voltage $V_{REF2}$. Dual COT controller 100 also includes an error comparator 106 which senses when the valley of the ripple is lower than comparator reference $V_{REF1}$. Error comparator 106 also generates an OnReq signal as shown in FIG. 1. Thus, error amplifier 104 and error comparator 106 receive a feedback signal from feedback pin FBS, the feedback signal including an external ripple injection signal. Error comparator 106 compares the feedback signal with a first reference signal $V_{REF1}$ and generates a $T_{ON}$ request based on the comparison of the feedback signal with the first reference signal $V_{REF1}$.

Dual COT controller 100 also contains a logic Schmitt trigger inverter 108 which uses the external Ground Feedback Sense (GFB) pin to configure the dual COT controller 100 as either a master (e.g., GFB is grounded and senses the load ground) or as a slave (e.g., where GFB=High=5V). This illustrates how dual controller 100 can be enabled as either a master or a slave. The designation of dual COT controller 100 as a master or a slave can be achieved in many other ways and thus the present disclosure is not limited to the above-mentioned methodology.

The ONR pin is an input/output pin which serves to send or receive inside the chip the OnReq signal generated by error comparator 106. When dual COT controller 100 is configured as a master, a multiplexer (MUX) 110 connects the OnReq signal to the ONR pin as an output and to the two controller blocks 112 and 114 to generate the two signals Req1 and Req2. When dual COT controller 100 is configured as a slave, MUX 110 disconnects the internal slave OnReq signal pin, and the ONR pin becomes an input so that the ONR input is delivered through MUX 110 to converters 112 and 114 to generate signals Req1 and Req2. This replaces the internal OnReq signal together with the internal error amplifier 104 and comparator 106, which, when dual COT controller 100 is acting as a slave, become disabled or unused. It should be noted that differential amplifier 102 having a gain of 1 and Schmitt Trigger inverter 108 using the input GFB to set the dual COT controller 100 as master or slave presented in FIG. 4 represents particular solutions to remote sensing and master/slave configuration. However, the present disclosure is not limited in this regard. Other arrangements, with or without remote sensing, and other methodologies or circuits may be used to determine whether dual COT controller 100 is a master or a slave.

According to one embodiment of the present disclosure as shown in FIG. 4, converters 112 and 114 are identical and each contains a memory bit, i.e., ActivePhaseBit 116, a Constant T$_{ON}$ generator 118, a Ctrl_Logic block 120 and a driver 122. Each converter 112 and 114 includes an AND gate 124 that, when the ActivePhaseBit 116 is equal to logic 1, serves the OnReq signal to the Constant T$_{ON}$ Generator 118 in both/all converters 112 and 114. Thus, converter 112 contains a first memory bit, i.e., ActivePhaseBit 116, a first Constant T$_{ON}$ generator 118, a first Ctrl_Logic block 120, a first driver 122 and a first AND gate 124. Converter 114 includes a second memory bit, i.e., ActivePhaseBit 116, a second Constant T$_{ON}$ generator 118, a second Ctrl_Logic block 120, a second driver 122 and a second AND gate 124.

As mentioned, dual COT controller 100 is not limited to just two converters 112 and 114 and more converters than those depicted in FIG. 4 may be included. Regardless of the number of converters, at any time in the dual COT controller 100 or the daisy chain paralleled controllers ring, there is just one ActivePhaseBit 116 equal to a first state, i.e., high, or logic 1, while all the other controllers have their ActivePhaseBit 116 equal to a second state, i.e., low, or logic 0. As a consequence, just one controller block senses the OnReq signal and generates a T$_{ON}$ signal which arrives at the respective driver 122 and respective switching control (SW) node.

In one embodiment, on the rising edge of constant T$_{ON}$ generator 118, a calibrated signal in size and duration (e.g., 5.0V, 100 nS) is transferred to an OR gate 128 at the RIP_INJ pin to ensure the necessary calibrated external ripple injection in feedback control signal (FBS) through the external resistor R3 and capacitor C2. On the rising edge of constant T$_{ON}$ generator 118, the ActivePhaseBit 116 is set to logic 0 for the current phase, so that power delivery and ripple injection of that phase remains uninterrupted. The Activate Phase Output signal APO1, which was logic 1, changes to logic 0, and the current phase ceases to sense the Req1=OnReq signal. The falling edge of the APO1 signal propagates through the Next Phase Input signal NPI2 and sets the ActivePhaseBit 116 to logic 1 in the next phase. In this way, converter block 114 can receive the OnReq=Req2 signal through its own AND gate 124 and serve the T$_{ON2}$ signal through driver 122 to SW2.

The operation of controller 114 is similar to that previously described for controller 112. The controller block 114 receives the next OnReq=Req2 signal through its own AND gate 124, generates a T$_{ON2}$ signal which goes to SW2, generates a calibrated ripple injection (e.g., 5.0V, 100 nS) signal which arrives through OR gate 128 to the RIP_INJ pin and changes the state of ActivePhaseBit 118 from logic 1 to logic 0. The APO2 signal output which transitions from logic 1 to logic 0 is transferred through the APO and NPI pins to NPI1. The transition of NPI1 to 0 will change the ActivePhaseBit 116 to logic 1 for controller 112, closing a ring operation of the daisy chain.

From the above description, it is evident that power delivery is performed in the timing sequence T$_{ON1}$, T$_{ON2}$, T$_{ON1}$, T$_{ON2}$ and so on, based on the OnReq signal multiplexed respectively to controller 112, controller 114, controller 112 and controller 114. The OnReq signal is sent from the master to the slaves. The current phase's injected calibrated ripple delivered through RIP_INJ ensures that the next valley of the ripple is used by the next phase. In this way, the phase sequential/interleaving activity is controlled by the injected ripple.

As shown in FIG. 4, the calibrated injected ripple delivered through RIP_INJ is not a function of V$_{IN}$ and V$_{OUT}$ or the duty cycle. This allows better control of the ripple amplitude when V$_{IN}$ and V$_{OUT}$ vary, i.e., when the input power rail changes or during a soft start when the output is moving. The calibrated injected ripple allows better optimization of precision and stability with the change of V$_{IN}$ and V$_{OUT}$. Further, this kind of calibrated ripple injection allows for dual COT controller 100 with 2 phases or other parallelable 4, 6, 8, . . . , 2*n phases to work with duty cycles greater than 50% and, in this way, increases the input voltage range. Further, T$_{ON}$=T$_{ON1}$=T$_{ON2}$ is the same for all phases present in the master and the slaves, and it does not vary as a function of the number of phases in a particular design.

An equivalent switching frequency for a polyphaser system with n phases using the present disclosure is:

$$\text{Equivalent\_Freq}_{System} = \frac{n * Vout}{Vin * Ton} \quad (1)$$

While each phase will work at a frequency:

$$Freq_{phase} = \frac{Freq_{System}}{n} \quad (2)$$

Figure 5:
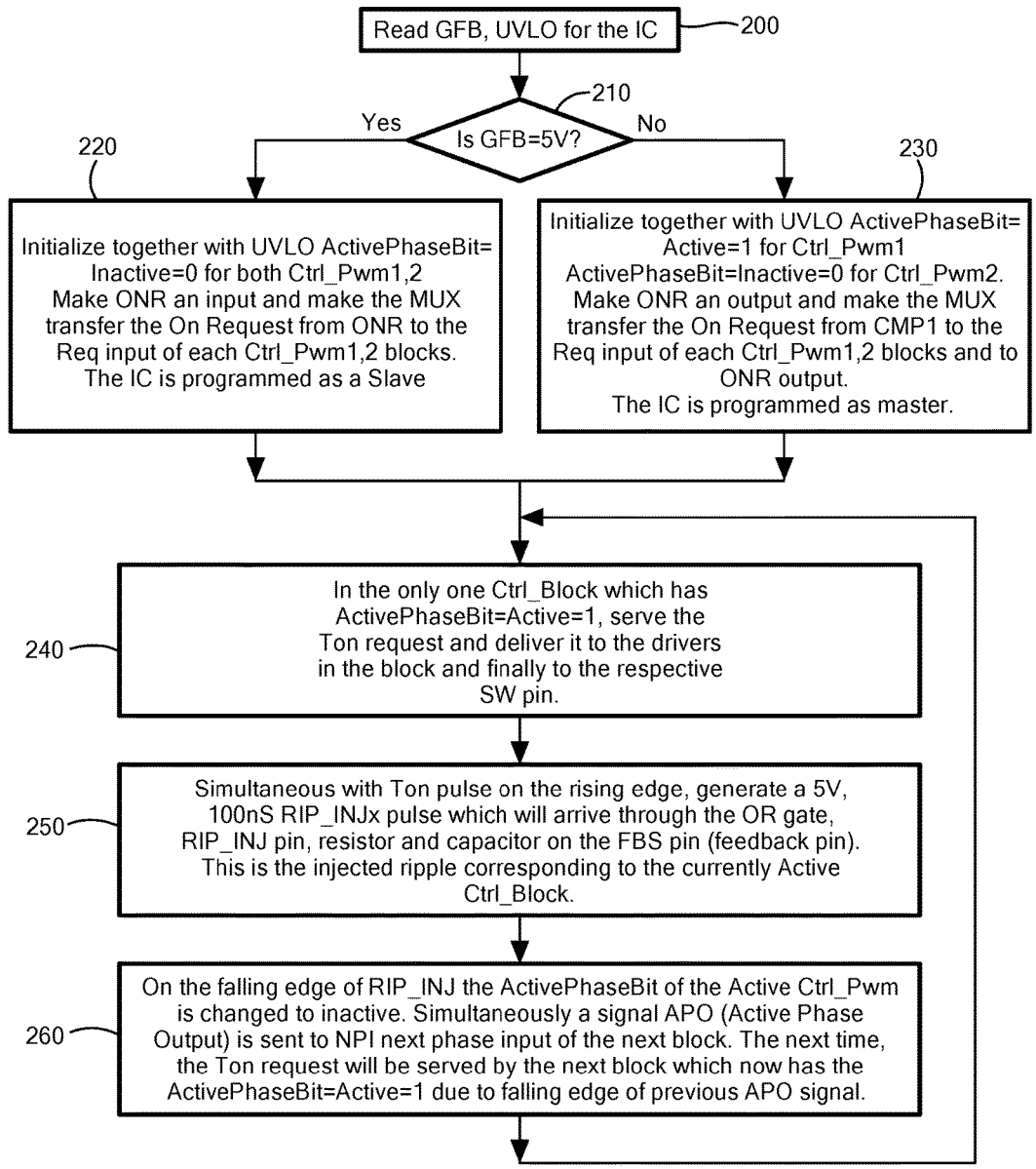
FIG. 5 is the flowchart describing the method of interleaving and paralleling the dual COT buck controllers with external injection in accordance with principles of the present disclosure.

FIG. 5 illustrates a flowchart of a method of running in a daisy chain one dual controller or several paralleled IC dual COT controllers for obtaining the correct interleaving/phasing in accordance with an embodiment of the present disclosure. The operation begins with the undervoltage lockout (UVLO) and GFB values being read, at step 200. These values are used to determine whether dual controller 100 is a master or a slave. For example, at step 210, if it is determined that the GFB is equal to 5 volts, then at step 220 the ActivePhaseBit 116 in each controller 112 and 114 is set to logic 0, the ONR signal is made as an input to MUX 110 and MUX 110 changes the OnReq signal from ONR to the Req input for each controller, i.e., Req1 for controller 112 and Req2 for controller 114. In this scenario, the dual controller 100 is a slave. However, if, at step 210 it is determined that GFB does not equal 5 volts, then at step 230, the ActivePhaseBit 116 is set to logic 1 for controller 112 and to logic 0 for controller 114, the ONR signal is made as an output and MUX 110 transfers the OnReq signal from CMP1 to the Req input for each controller, i.e., Req1 for controller 112 and Req2 for controller 114 and to the ONR output. In this scenario, the dual controller 100 is a master. Only one ActivePhaseBit=1 will be initialized inside the master channel in controller 112 block. The rest of the phases will have ActivePhaseBit=0. The master will transfer the ReqT$_{ON}$ signal to all the other external slave chips through the ONR pin. The ONR pin is an output for the master and an input for all other chip slaves.

After initialization, the activity starts in the phase which is currently active, i.e., the one having ActivePhaseBit 116 equal to logic 1, as step 240. In step 240, the phase can receive the ReqT$_{ON}$ and process it by generating a T$_{ON}$ signal transferred through driver 122 to the SW pin. In step 250, simultaneous with the T$_{ON}$ pulse on the rising edge, a ripple injection pulse, i.e., a 5 V, 100 nS RIP_INJx pulse, arrives through OR gate 128 at the RIP_INJ pin, capacitor C2 and resistor R3 on the FBS pin. This is the external injected ripple signal corresponding to the currently active converter block (i.e., 112 or 114).

Then, in step 260, on the falling edge of RIP_INJ, the current phase's ActivePhaseBit 116 is set to logic 0, i.e., set to "inactive." Simultaneously, an Active Phase Output (APO) signal is sent to the next phase input (NPI) of the next converter block. Subsequently, the T$_{ON}$ request will be served by the next converter block, which now has ActivePhaseBit 116 equal to logic 1 ("active") due to the falling edge of the previous APO signal. From that moment, the new active phase will receive and process the ReqT$_{ON}$ signal in an identical manner. The process repeats itself in a daisy chain ring activating the next phase to sense ReqT$_{ON}$ and deliver the T$_{ON}$ until the daisy chain ring is closed resulting in a periodical operation.

Figure 6:
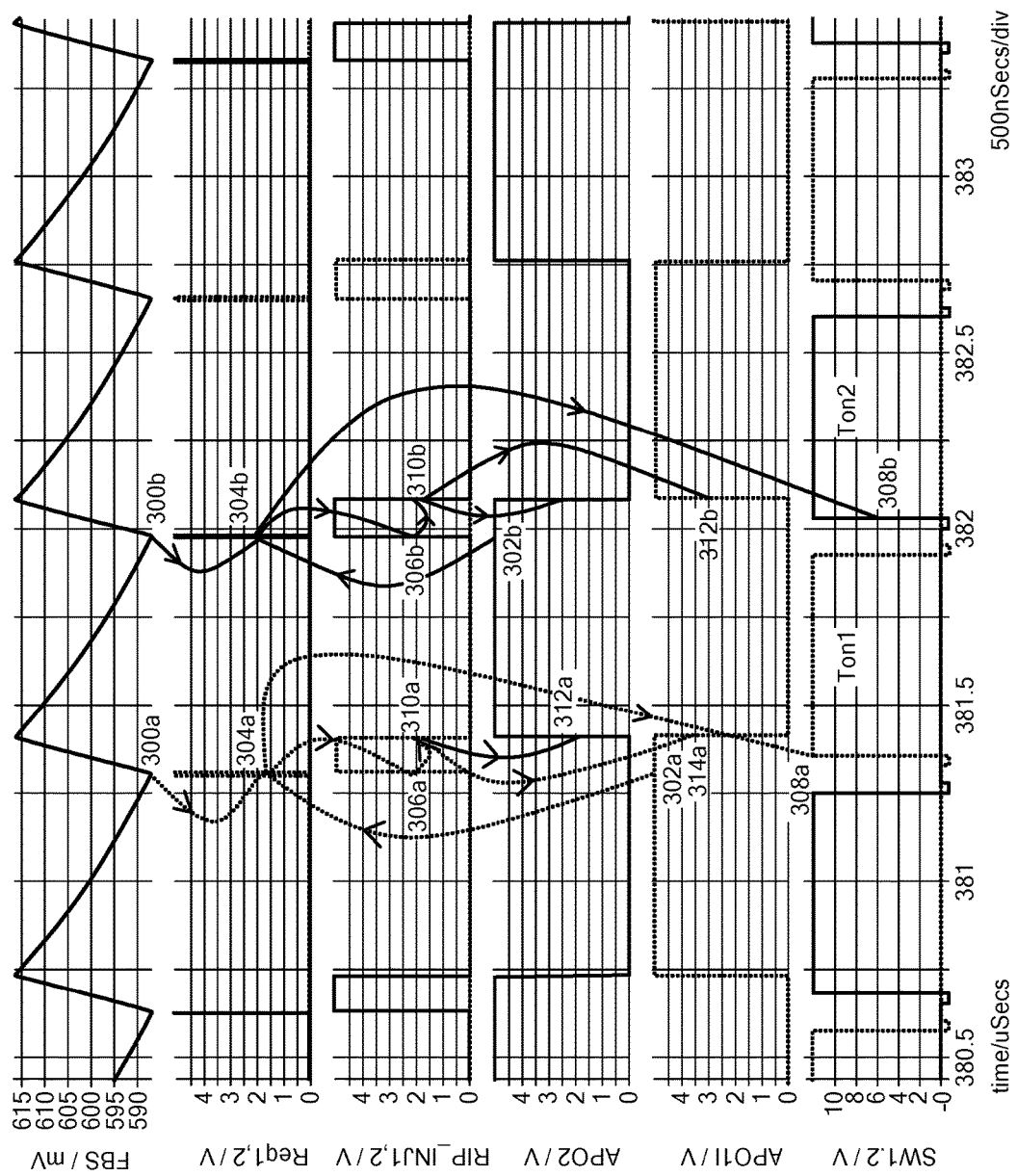
FIG. 6 is a timing diagram explaining the signals used to interleave and parallel the dual COT buck controllers in accordance with principles of the present disclosure.

FIG. 6 is an exemplary timing diagram of the dual COT controller daisy chain signals allowing the phasing/interleaving with application to an arbitrary number of paralleled controllers, in accordance with an embodiment of the present disclosure. The timing starts with the valley of the FBS pin ripple being sensed, at time 300a. Due to APO1=1, at time 302a, the signal is allowed to propagate through AND gate 124 to become Req1 at time 304a. The rising edge at time 304a of Req1 will trigger the rise of RIP_INJ1 at time 306a and the rise of T$_{ON1}$. T$_{ON1}$ will propagate to SW1, at time 308a. After approximately 100 nS, RIP_INJ1 falls and its falling edge at time 310a terminates at APO1=0, at time 314a and triggers APO2=1 at time 312a. Starting from 312a, it is converter block 114 that receives APO2=1 at time 302b and senses the FBS valley ripple at time 300b, generating the Req2 at time 304b. The signal sequence repeats itself in converter block 114, i.e., the rise of Req2 at time 304b triggers the rise of T$_{ON2}$ and the rise of SW2 at time 308b, as well as the rise of RIP_INJ2 at time 306b. RIP_INJ2 lasts approximately 100 nS until it falls at time 308b. The fall of RIP_INJ2 at time 310b terminates at APO2=0 and triggers APO1=1 at time 312b. At that moment, the daisy chain ring closes and the switching cycle repeats itself.

Figure 7:
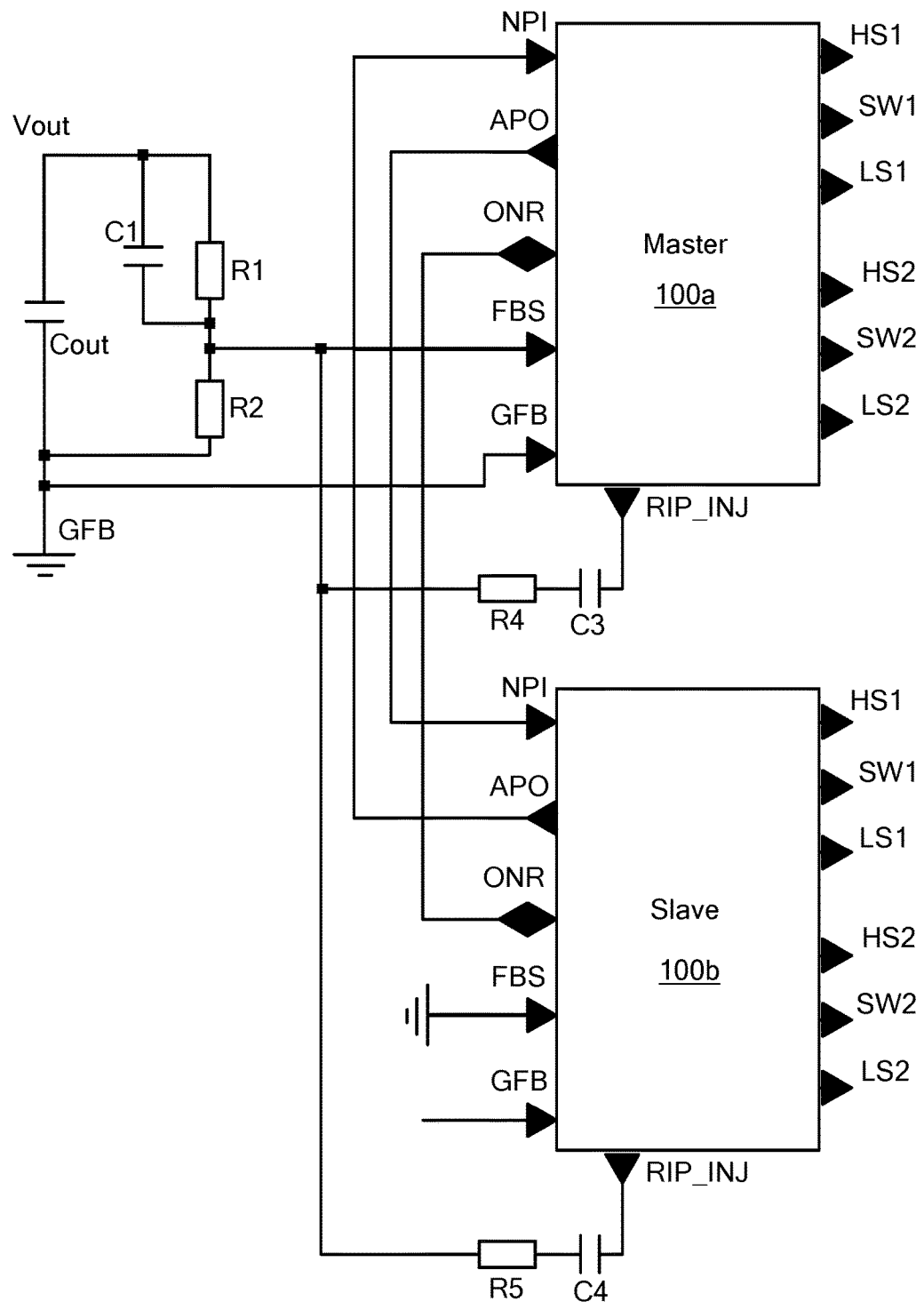
FIG. 7 is a circuit for paralleling two dual COT buck controllers (4 phases) in a daisy chain in accordance with principles of the present disclosure.

FIG. 7 is an exemplary circuit for paralleling two dual COT controller (4 phases), in accordance with an embodiment of the present disclosure. The initialization phase (GFB) configures the top controller 100a as master and the bottom controller 100b as slave. The OnReq comes from the master output ONR and is transferred to the slave input ONR. The active phase which receives the OnReq is initialized as the converter CtrlPwm of the top controller which is configured as master. The rest of the phases are configured as slaves. The state of ActivePhaseBit=1 is shifted from one phase to the other in the daisy chain ring using master-slave connections internal to each controller and then fed to external pins, i.e., APO Master, NPI Slave, APO Slave and NPI master. The RIP_INJ from the master and slave are summed through two RC networks at the FBS pin of the master. In a similar way, more than 2 dual COT controllers realizing 6, 8, 10, 12, 2*n phases can be tied in a daisy chain ring.

As discussed above and illustrated in FIGS. 4 and 7, allowing the ActivePhaseBit 116 to equal logic 1 allows the treatment of the T$_{ON}$ request generated by the PWM comparator sequentially in series by each converter, i.e., 112, 114, etc., in the daisy chain ring. The RIP_INJ pin allows the injection of the ripple in the feedback pin as a calibrated precise pulse. This type of injection creates the correct time separated valleys for the voltage ripple in the feedback pin to get the correct phasing. The resulting ripple in the feedback is constantly related to V$_{OUT}$ and V$_{IN}$ thereby improving the line rejection. The injected ripple is not current related and allows phasing with duty cycles greater than 50%.

Figure 8:
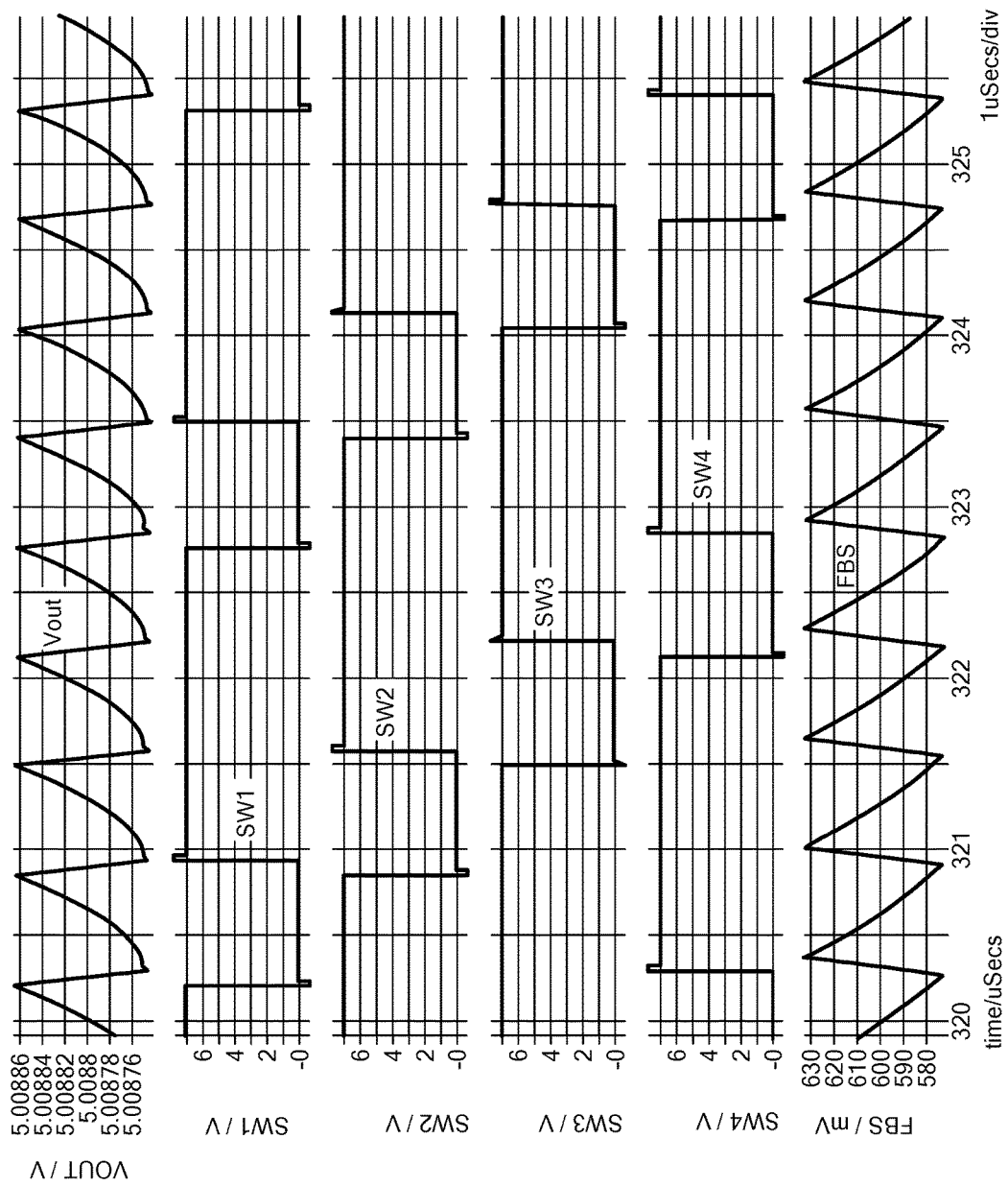
FIG. 8 illustrates the waveforms of a 4 phase system working with a duty cycle greater than 50% in accordance with principles of the present disclosure.

FIG. 8 presents the waveforms illustrating a duty cycle greater than 50% for a 4 phase system obtained by paralleling two dual phase COT controllers. Due to the calibrated injected pulses through RIP_INJ from master and slave, the FBS pin at the master receives a ripple which allows the interleaving of phases and duty cycle >50%. The ripple produced on the FBS at the master by this external injection is different from the ripple at the output voltage in amplitude and phase.

In one aspect of the disclosure, a multiple-phase parallelable constant on time (COT) buck controller 100 is provided. A first phase contains a first memory bit, i.e., ActivePhaseBit 116, and a second phase contains a second memory bit, i.e., ActivePhaseBit 116. The buck controller 100 includes a first converter 112 having a first constant T$_{ON}$ generator 112 configured to sense and deliver a first T$_{ON}$ request when the first memory bit 116 is in a logic one state and a second converter 114 connected in parallel with the first converter 112, the second converter configured to sense and deliver a second T$_{ON}$ request when the second memory bit 116 is the logic one state wherein, only one of the first memory bit 116 and the second memory bit 116 is in the logic one state thus generating activity in a daisy chain ring where each of the first converter and the second converter senses and delivers a corresponding T$_{ON}$ request in a sequential manner. In one embodiment of this disclosure, COT buck controller 100 further includes an error amplifier 104 and an error comparator 106, each configured to receive a feedback signal from a feedback pin (FBS), the feedback signal including an external ripple injection signal. Error comparator 106 is further configured to compare the feedback signal with a first reference signal V$_{REF1}$ and generate a T$_{ON}$ request based on the comparison of the feedback signal with the first reference signal V$_{REF1}$.

In another embodiment, the first converter 112 further includes a first AND gate 124 and the second converter 114 includes a second AND gate 124, wherein when the first memory bit 116 is in the logic one state, first AND gate 124 delivers the first T$_{ON}$ request to the first constant T$_{ON}$ generator 118 and when the second memory bit 116 is in the logic one state, the second AND gate 124 delivers the second T$_{ON}$ request to the second constant T$_{ON}$ generator 118. In another embodiment, COT buck controller 100 further includes an inverter 108 that utilizes a ground feedback sense signal (GFB) to generate a logic signal for determining if COT buck controller 100 is a master or a slave where more than one COT buck controllers 100 are paralleled. In another embodiment, if COT buck controller 100 is designated as a master, error amplifier 104 and error comparator 106 are activated, and if COT buck controller 100 is designated as a slave, error amplifier 104 and error comparator 106 are disabled.

In another embodiment, COT buck controller 100 further includes a MUX 110 for allowing configuration of each COT buck controller 100 as either a master or a slave where more than one COT buck controllers 100 are paralleled, MUX 110 configured to distribute the T$_{ON}$ request from the master to each slave through an ONR signal. In another embodiment, COT buck controller 100 further includes an NPI control logic signal, and an APO control logic signal which allow multiple phases to be paralleled and work in a daisy chain configuration ring. In another embodiment, COT buck controller 100 further includes an OR gate 128 configured to sum a first injected ripple current signal from first converter 112 and a second injected ripple current signal from second converter 114 to produce an external injection ripple signal distributed to a feedback pin through OR gate 128.

In another aspect of the disclosure, a method of paralleling dual COT buck converters 100 is provided. The method includes sensing and delivering, by first converter 112, a first T$_{ON}$ request when first memory bit 116 is in a logic one state, and sensing and delivering, by second converter 114 in parallel with first converter 112, a second $T_{ON}$ request when second memory bit 116 is the logic one state, second converter 114 connected in parallel with first converter 112, wherein, only one of first memory bit 116 and second memory bit 116 is in the logic one state thus generating activity in a daisy chain ring wherein each of the first converter and the second converter senses and delivers a corresponding $T_{ON}$ request in sequential manner.

In one embodiment of this aspect, the method further includes receiving a feedback signal, the feedback signal including an external ripple injection signal, comparing the feedback signal with a first reference signal $V_{REF1}$, and generating a $T_{ON}$ request based on the comparison of the feedback signal with the first reference signal $V_{REF1}$. In another embodiment, the method includes delivering, by first AND gate 124, a first $T_{ON}$ request to first constant $T_{ON}$ generator 118 when first memory bit 116 is in the logic one state, and delivering, by second AND gate 116, the second $T_{ON}$ request to second constant $T_{ON}$ generator 118 when second memory bit 116 is in the logic one state. In another embodiment, the method further includes allowing for paralleling of first converter 112 and second converter 114, and allowing configuration of COT buck controller 100 as one of a master or a slave.

In another embodiment, the method further includes using a ground feedback sense signal (GFB) to generate a logic signal for determining if COT buck controller 100 is a master or a slave where more than one COT buck controllers 100 are paralleled. In another embodiment, if COT buck controller 100 is designated as a master, activating error amplifier 104 and error comparator 106, and if COT buck controller 100 is designated as a slave, disabling error amplifier 104 and error comparator 106. In another embodiment, the method further includes configuring each COT buck controller 100 as either a master or a slave where more than one COT buck controllers 100 are paralleled; and distributing the $T_{ON}$ request from the master to each slave through an ONR signal.

In another embodiment, the method further includes providing an NPI control logic signal, and an APO control logic signal which allow multiple phases to be paralleled and work in a daisy chain configuration ring. In another embodiment, the method further includes summing, by OR gate 128, a first injected ripple current signal from first converter 112 and a second injected ripple current signal from second converter 114 to produce an external injection ripple signal distributed in a feedback pin through OR gate 128. In another embodiment, the external injection ripple signal corresponds to one of the first memory bit 116 and the second memory bit 116 being in the logic one state.

In another aspect of the disclosure, a method of using calibrated injection ripple internally or externally for single converters or multiphase converters in order to generate a constant ripple in a feedback pin independent of $V_{IN}$, $V_{OUT}$ or duty cycle thus providing COT converters 100 increased precision, stability and duty cycle, is provided.

In yet another aspect of the disclosure, a dual-phase or multiple-phase parallelable COT buck controller 100 is provided and includes the following:
  Two or more MOSFET drivers 122 which can be internal or external.
  Two or more constant $T_{on}$ Generators 118.
  Two or more ripple injection blocks 126 calibrated in amplitude and duration (e.g., 5V, 100 nS).
  Two or more status bits latch circuits with corresponding Ctrl Logic 120 assigned to each channel. The status bits allow the treatment of the $T_{ON}$ request for sensing and delivering the $T_{ON}$ to the respective driver 122 in a serial daisy chain ring sequence.
  One error amplifier 104 to obtain the error between the feedback pin and the main reference.
  One error comparator 106 to obtain the $T_{ON}$ request when the valley of the error is under the comparator reference.
  An analog multiplexer 110 to allow the paralleling of several dual COT controllers 100 and allowing the configuration as a master or a slave of the controller 100.
  One ONR pin configured as output for the master to transfer the OnReq to one or more slaves. ONR is configured as an input for the slaves to receive the OnReq from the master.
  One Active Phase Output (APO) pin which signals to the next channel that the current channel is busy. After the $T_{ON}$ is served, this goes inactive, i.e., to 0V and the next channel takes over to sense the $T_{ON}$ request and serve it.
  One Next Phase In (NPI) input pin which receives the APO signal and allows the $T_{ON}$ sensing and delivering once APO=NPI is inactive (i.e., 0V).
  One RIP_INJ output pin used to sum two injected ripples through an OR gate 128 to the FBS pin. This RIP_INJ signal together with capacitor C1, resistor R2, resistor R1, resistor R3, and capacitor C2 will generate the necessary ripple in FBS for the Constant $T_{ON}$ buck controller.

In yet another aspect of the disclosure, a dual-phase or multiple-phase parallelable COT buck controller 100 is provided and includes a calibrated injection ripple which can be external as in FIG. 1 or internal if elements C1, R2, R1, R3, C2 are built internally. The calibrated ripple injection:
  Allows duty cycles greater than 50% for the dual COT buck converter 100 and multiphase system putting several such controllers in parallel.
  Improves the input supply rejection due to constant DC error associated with the constant peak-to-peak ripple voltage.
  Can be applied to COT buck controllers 100 containing just an error comparator, providing an increased precision through the peak-to-peak voltage constant ripple generated independent of $V_{IN}$ and $V_{OUT}$.

What is claimed is:

1. A multiple-phase parallelable constant on time (COT) buck controller, a first phase containing a first memory bit and a second phase containing a second memory bit, the COT buck controller comprising:
  a first converter comprising a first constant $T_{ON}$ generator configured to sense and deliver a first $T_{ON}$ request when the first memory bit is in a logic one state; and
  a second converter connected in parallel with the first converter, the second converter comprising a second constant $T_{ON}$ generator configured to sense and deliver a second $T_{ON}$ request when the second memory bit is in a logic one state,
  only one of the first memory bit and the second memory bit being in the logic one state thus generating activity in a daisy chain ring wherein each of the first converter and the second converter senses and delivers a corresponding $T_{ON}$ request in a sequential manner.

2. The COT buck controller of claim 1, further comprising an error amplifier and an error comparator, each configured to receive a feedback signal from a feedback pin, the feedback signal including an external ripple injection signal, the error comparator further configured to:
compare the feedback signal with a first reference signal; and
generate a $T_{ON}$ request based on the comparison of the feedback signal with the first reference signal.

3. The COT buck controller of claim 1, the first converter further comprising a first AND gate and the second converter further comprising a second AND gate, wherein when the first memory bit is in the logic one state, the first AND gate delivers the first $T_{ON}$ request to the first constant $T_{ON}$ generator and when the second memory bit is in the logic one state, the second AND gate delivers the second $T_{ON}$ request to the second constant $T_{ON}$ generator.

4. The COT buck controller of claim 2, further comprising an inverter that utilizes a ground feedback sense signal to generate a logic signal for determining if the COT buck controller is a master or a slave where more than one COT buck controllers are paralleled.

5. The COT buck controller of claim 4, wherein if the COT buck controller is designated as a master, the error amplifier and the error comparator are activated, and if the COT buck controller is designated as a slave, the error amplifier and the error comparator are disabled.

6. The COT buck controller of claim 4, further comprising a multiplexer for allowing configuration of each COT buck controller as either a master or a slave where more than one COT buck controllers are paralleled, the multiplexer configured to distribute the $T_{ON}$ request from the master to each slave through an ONR signal.

7. The COT buck controller of claim 1, further comprising an input control logic signal, and an output control logic signal which allow multiple phases to be paralleled and work in a daisy chain configuration ring.

8. The COT buck controller of claim 1, further comprising an OR gate configured to sum a first injected ripple current signal from the first converter and a second injected ripple current signal from the second converter to produce an external injection ripple signal distributed to a feedback pin through the OR gate.

9. A method of paralleling COT buck converters, the method comprising:
sensing and delivering, by a first converter, a first $T_{ON}$ request when a first memory bit in a first phase is in a logic one state; and
sensing and delivering, by a second converter in parallel with the first converter, a second $T_{ON}$ request when a second memory bit in a second phase is the logic one state;
only one of the first memory bit and the second memory bit being in the logic one state thus generating activity in a daisy chain ring wherein each of the first converter and the second converter senses and delivers a corresponding $T_{ON}$ request in a sequential manner.

10. The method of claim 9, further comprising:
receiving a feedback signal, the feedback signal including an external ripple injection signal;
comparing the feedback signal with a first reference signal; and
generating a $T_{ON}$ request based on the comparison of the feedback signal with the first reference signal.

11. The method of claim 9, further comprising:
delivering, by a first AND gate, the first $T_{ON}$ request to the first constant $T_{ON}$ generator when the first memory bit is in the logic one state; and
delivering, by a second AND gate, the second $T_{ON}$ request to the second constant $T_{ON}$ generator when the second memory bit is in the logic one state.

12. The method of claim 9, further comprising:
allowing for paralleling of the first converter and the second converter; and
allowing configuration of the COT buck controller as one of a master or a slave.

13. The method of claim 12, further comprising using a ground feedback sense signal to generate a logic signal for determining if the COT buck controller is a master or a slave where more than one COT buck controllers are paralleled.

14. The method of claim 12, wherein if the COT buck controller is designated as a master, activating an error amplifier and an error comparator, and if the COT buck controller is designated as a slave, disabling the error amplifier and the error comparator.

15. The method of claim 12, further comprising:
configuring each COT buck controller as either a master or a slave where more than one COT buck controllers are paralleled; and
distributing the $T_{ON}$ request from the master to each slave through an ONR signal.

16. The method of claim 9, further comprising providing an input control logic signal, and an output control logic signal which allow multiple phases to be paralleled and work in a daisy chain configuration ring.

17. The method of claim 9, further comprising summing, by an OR gate, a first injected ripple current signal from the first converter and a second injected ripple current signal from the second converter to produce an external injection ripple signal distributed in a feedback pin through the OR gate.

18. The method of claim 17, wherein the external injection ripple signal corresponds to one of the first memory bit and the second memory bit being in the logic one state.

19. A method of using calibrated injection ripple internally or externally generated for single converters or multiphase converters in order to generate a constant ripple in a feedback pin independent of $V_{IN}$, $V_{OUT}$ or duty cycle thus providing COT converters increased precision, stability and duty cycle.

* * * * *